US010615502B2

(12) United States Patent
Kerselaers et al.

(10) Patent No.: US 10,615,502 B2
(45) Date of Patent: Apr. 7, 2020

(54) NEAR-FIELD ELECTROMAGNETIC INDUCTION (NFEMI) ANTENNA

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 16/023,916

(22) Filed: Jun. 29, 2018

(65) Prior Publication Data

US 2020/0006851 A1 Jan. 2, 2020

(51) Int. Cl.
*H01Q 21/00* (2006.01)
*H01Q 7/00* (2006.01)

(52) U.S. Cl.
CPC .................................. *H01Q 7/005* (2013.01)

(58) Field of Classification Search
CPC .......... H01Q 7/005; H01Q 1/36; H01Q 7/00; H01Q 1/2208; H02J 7/025; H02J 50/10; H02J 50/80; H04B 5/0037; H04B 5/0075; H04B 5/0081; H04B 5/0031
See application file for complete search history.

(56) References Cited

U.S. PATENT DOCUMENTS

| 9,197,986 B1 | 11/2015 | Kerselaers et al. | |
| 9,941,937 B1 | 4/2018 | Kerselaers et al. | |
| 2015/0318603 A1 | 11/2015 | Kerselaers et al. | |
| 2015/0318932 A1 | 11/2015 | Kerselaers et al. | |
| 2017/0062949 A1* | 3/2017 | Kerselaers | H04B 5/0031 |
| 2019/0341678 A1* | 11/2019 | Gomme | H01Q 9/0407 |
| 2019/0363459 A1* | 11/2019 | Geens | H04B 5/0012 |

* cited by examiner

*Primary Examiner* — Hai V Tran
*Assistant Examiner* — David E Lotter

(57) ABSTRACT

One example discloses a near-field electromagnetic induction (NFEMI) antenna device, having: a coil, having first and second coupling points, configured to generate and/or receive a magnetic (H-field) near-field signal; a conductive structure having first and second coupling points separated by a distance; first and second feed points configured to carry a current from a transmitter and/or to a receiver circuit; wherein the first coupling point of the conductive structure is coupled to the first feed point and wherein the second coupling point of the conductive structure is coupled to the first coupling point of the coil; wherein the second coupling point of the coil is coupled to the second feed point; and wherein the conductive structure is configured to generate an electric (E-field) near-field in response to the current flowing over the distance between the first and second coupling points of the conductive structure.

20 Claims, 9 Drawing Sheets

NEAR-FIELD ELECTROMAGNETIC INDUCTION (NFEMI) ANTENNA

The present specification relates to systems, methods, apparatuses, devices, articles of manufacture and instructions for near-field electromagnetic induction (NFEMI) antennas.

SUMMARY

According to an example embodiment, a near-field electromagnetic induction (NFEMI) antenna device, comprising:
a coil, having first and second coupling points, configured to generate and/or receive a magnetic (H-field) near-field signal;
a conductive structure having first and second coupling points separated by a distance;
first and second feed points configured to carry a current from a transmitter and/or to a receiver circuit;
wherein the first coupling point of the conductive structure is coupled to the first feed point and wherein the second coupling point of the conductive structure is coupled to the first coupling point of the coil;
wherein the second coupling point of the coil is coupled to the second feed point; and
wherein the conductive structure is configured to generate an electric (E-field) near-field in response to the current flowing over the distance between the first and second coupling points of the conductive structure.

In another example embodiment, the current is an RF current including either an AC current and/or DC current; and the conductive structure is configured to generate the E-field in response to the RF current flowing over the distance between the first and second coupling points of the conductive structure.

In another example embodiment, the current is spread out on the conductive structure such that E-field vectors cover a total surface of the conductive structure.

In another example embodiment, the conductive structure is a short loaded dipole antenna.

In another example embodiment, further comprising a second conductive structure having first and second coupling points separated by a second distance;
wherein the first coupling point of the second conductive structure is coupled to the second feed point and wherein the second coupling point of the second conductive structure is coupled to the second coupling point of the coil; and
wherein the second conductive structure is configured to generate a second E-field in response to the current flowing over the second distance between the first and second coupling points of the second conductive structure.

In another example embodiment, further comprising a second conductive structure having a single coupling point;
wherein the single coupling point is coupled to either the first or second feed points; and
wherein the second conductive structure is configured to generate a second E-field in response to a voltage at the single coupling point.

In another example embodiment, the first and the second coupling points are separated by a greatest attachable (i.e. permitted by the method of fabrication used) distance between any two locations on the conductive structure.

In another example embodiment, the first and the second coupling points are at located at less than a greatest attachable distance between any two locations on the conductive structure; and the conductive structure is configured to generate the E-field by both the current between, and a voltage at, the first and second coupling points of the conductive structure.

In another example embodiment, the conductive structure is configured to prevent galvanic contact with a user.

In another example embodiment, the conductive structure is a substantially flat plate.

In another example embodiment, further comprising an electronic device having a set of user touch points; and wherein the conductive structure is coupled to at least one of the user touch points.

In another example embodiment, the user touch points include at least one of: a power button, a home button, a volume control, or a device control button.

In another example embodiment, the user touch points include an outer edge of the electronic device configured to be in contact with a user.

In another example embodiment, the user touch points are configured to be in direct contact with a user's skin.

In another example embodiment, the electronic device is at least one of: a smartphone, a smartwatch, a wearable device, a hearing aid, an earbud, or a medical sensor.

In another example embodiment, further comprising an electromagnetic interference (EMI) screen;
wherein the conductive structure is on one side of the EMI screen; and
wherein the coil is on an opposite side of the EMI screen.

In another example embodiment, the EMI screen is a wire mesh.

In another example embodiment, the EMI screen is connected to a power supply.

In another example embodiment, further comprising an electronic device having a set of circuits, and an electromagnetic interference (EMI) screen; and wherein the set of circuits are on one side of the EMI screen and the conductive structure is on an opposite side of the EMI screen.

In another example embodiment, the NFEMI antenna is coupled to a set of supporting circuitry including at least one of: a balanced or unbalanced transceiver, a capacitor bank for tuning the antenna for a particular resonance frequency; or a resistor bank for adjusting a bandwidth of the antenna.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
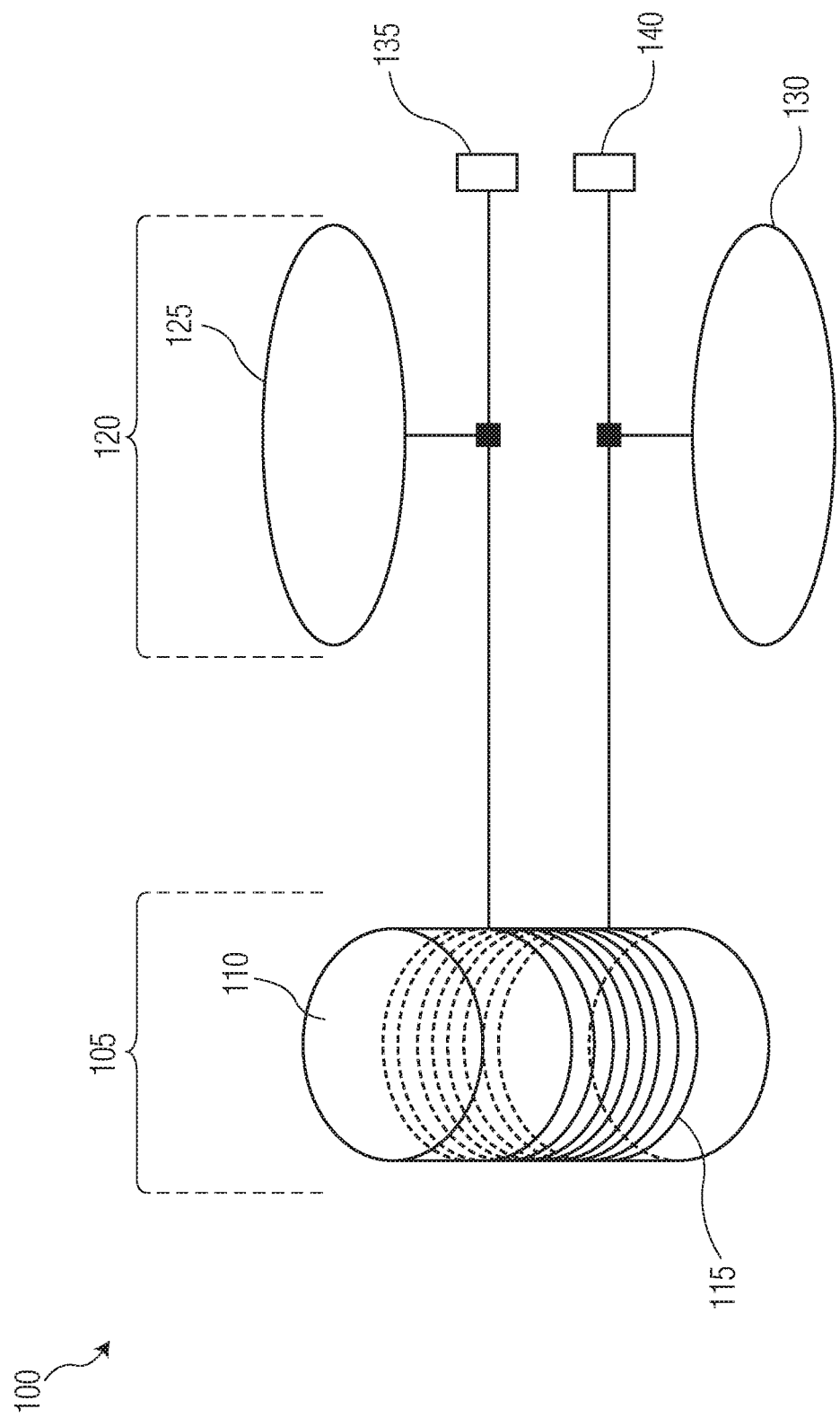
FIG. 1 is an example near-field electromagnetic induction (NFEMI) antenna having a voltage driven conductive structure.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are body communication and other wireless networked devices based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

FIG. 1 is an example near-field electromagnetic induction (NFEMI) antenna 100 having a voltage driven conductive structure. The antenna 100 in this example is an electromagnetic induction (NFEMI) antenna. In some example embodiments, the antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two voltage driven (i.e. AC current) conductive loading structures 125 and 130. Antenna 100 feed points 135, 140 are coupled to various transceiver circuitry, such as downstream radio transmitter and receiver integrated circuit (RF-IC), (not shown here).

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced.

Figure 2:
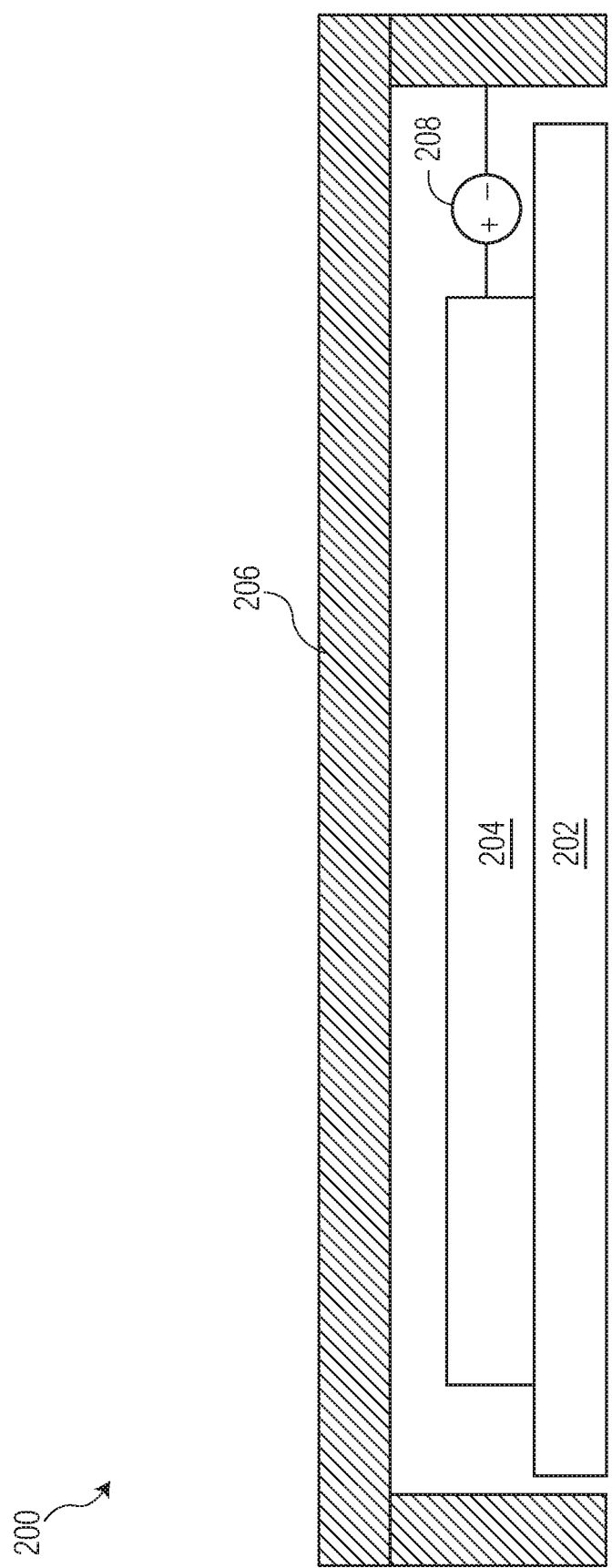
FIG. 2 is an example mobile device including the NFEMI antenna having the voltage driven conductive structure.

FIG. 2 is an example 200 mobile device including the NFEMI antenna 100 having the two voltage driven conductive structures 125, 130. The mobile device 200 (e.g. a smartphone) includes a printed circuit board 202 hosting various electronic components 204.

A conducting Electromagnetic Interference (EMI) screen 206 partially surrounds the electronic components 204. The EMI screen 206 attenuates undesired interference signals from entering or leaving the mobile device 200 to reduce a chance of malfunctions occurring. In addition, the mobile device 200 may need to comply with various country's limits on radiation emissions, so as to protect other nearby devices from malfunctioning.

The electronic components 204 are in this example powered by a battery 208. To minimize electric static discharge (ESD) problems, a negative supply connection of the battery is also connected to the EMI screen 206.

Since the NFEMI antenna 100 discussed above includes voltage driven (i.e. AC current driven) conductive structures 125, 130, including the NFEMI antenna 100 in the mobile device 200 with such an EMI screen 206 would substantially, if not completely, attenuate the conductive structures' 125, 130 E-field near-field signal.

Note, connecting the conductive structures 125, 130 to the grounded EMI screen 206 would short the NFEMI antenna 100 and prevent both H-field and E-field generation. Also, placing the conductive structures 125, 130 next to the grounded EMI screen 206 would create a large parasitic capacitance that would also substantially attenuate the E-field near-field signal, even if the conductive structures 125, 130 were placed outside of the EMI screen 206. Thus the NFEMI antenna 100 would be difficult to implement in various mobile and/or wearable products that have metal EMI screens 206.

Figure 3:
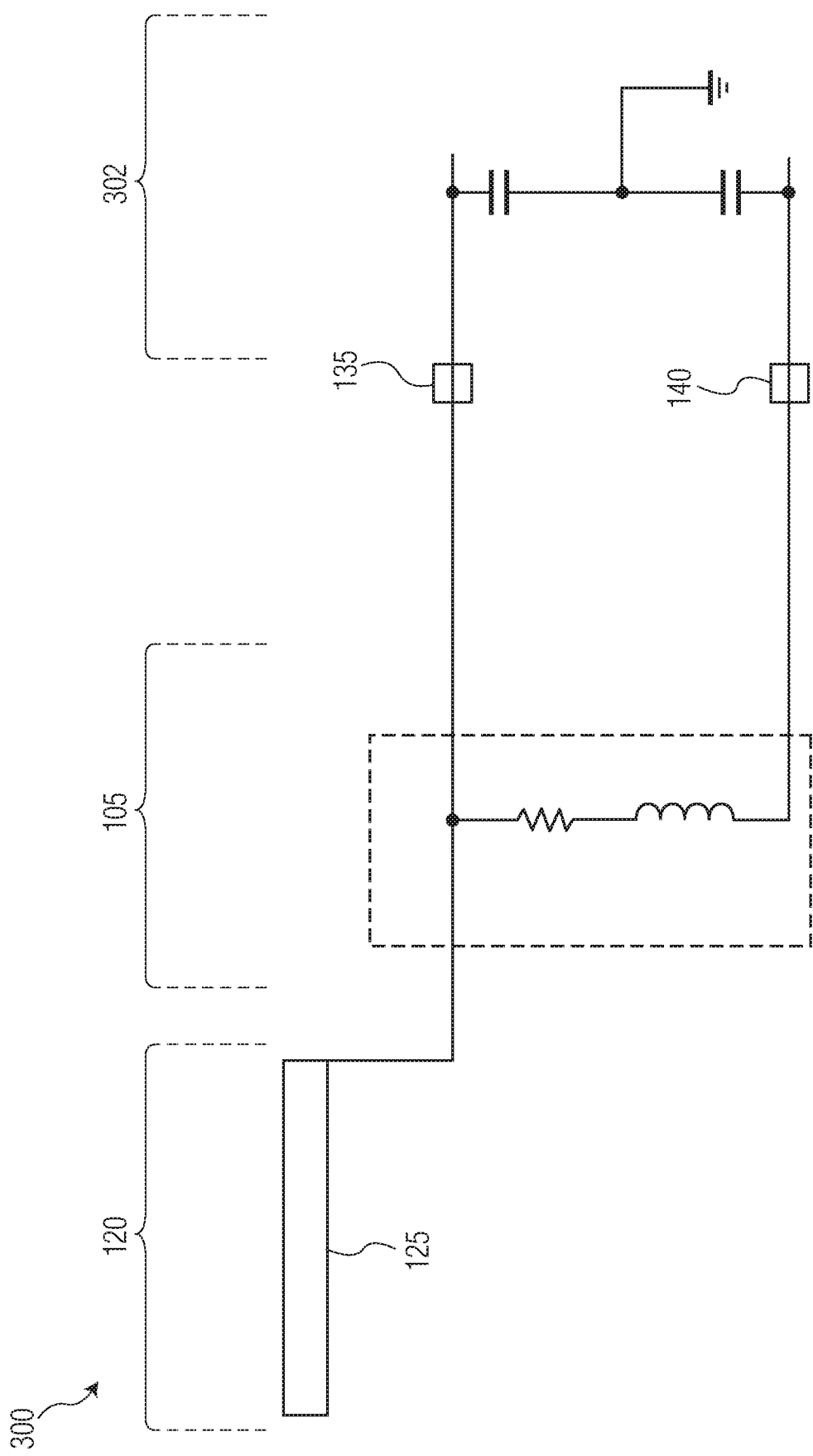
FIG. 3 is an example schematic of the NFEMI antenna having the voltage driven conductive structure.

FIG. 3 is an example 300 schematic of the NFEMI antenna 100 having the voltage driven conductive structure 125. The H-field antenna 105 is connected to feed points 135, 140. The E-field antenna 120 conductive structure 125 is coupled to feed point 135.

The feed points 135, 140 are coupled to transceiver circuitry (RF-IC) 302. In this example 300 the transceiver circuitry (RF-IC) 302 has a balanced input configuration.

If the E-field antenna 120 was also used as the conductive EMI screen 206, it would initially seem that this would function very well, since a user would be strongly coupled to the E-field antenna 120; however, since the conductive EMI screen 206 would be connected to ground (e.g. a negative pole of a power supply such as the battery 208), and thus the E-field antenna 120 would be short circuited as would also be the H-field antenna 105. A virtual reference level of the balanced input in the transceiver 302 is also connected to ground and is thus also shorted to the E-field antenna 120.

Figure 4A:
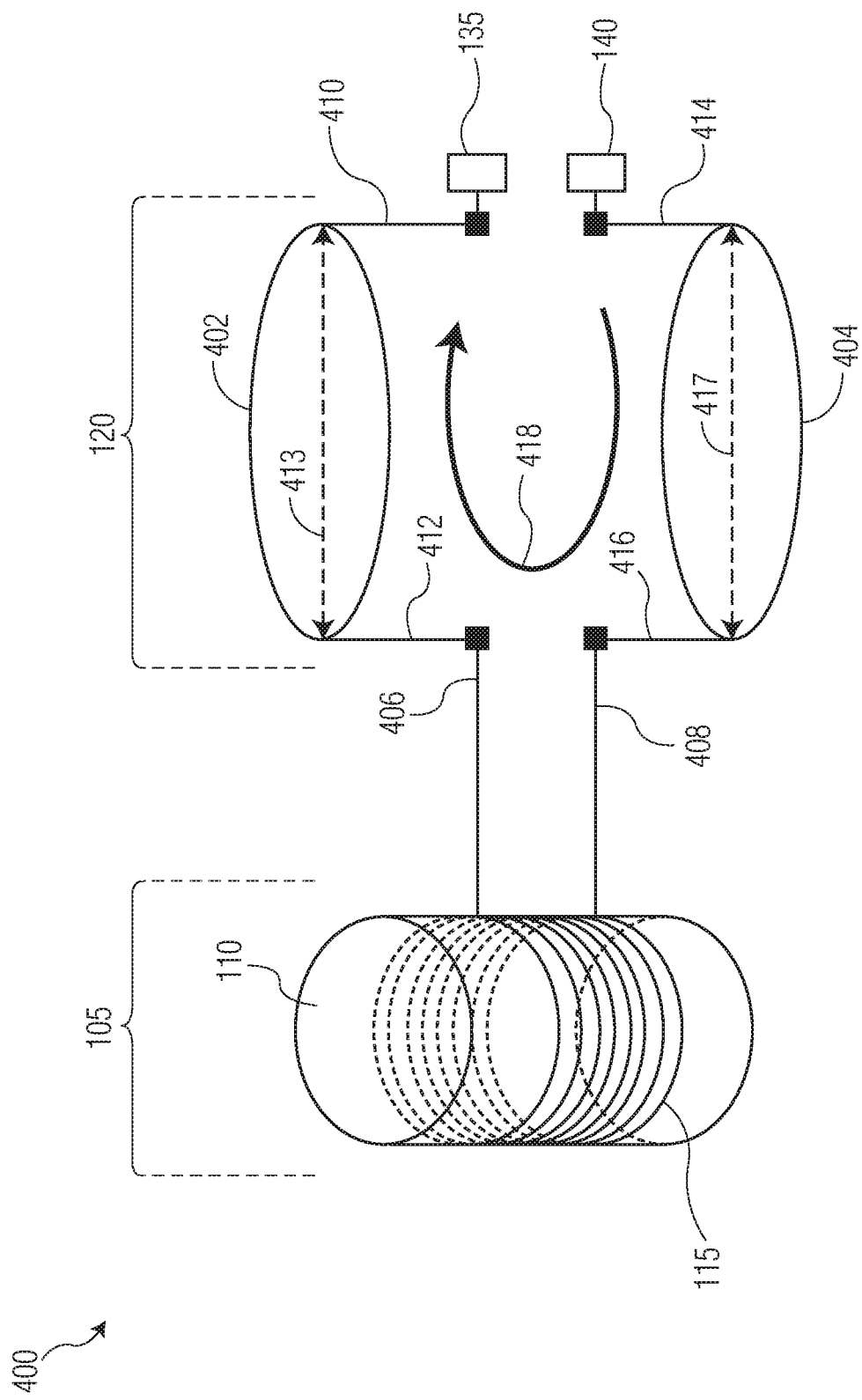
FIG. 4A is a first example NFEMI antenna having two current driven conductive structures.

FIG. 4A is a first example 400 NFEMI antenna having two current driven conductive structures. The first example 400 NFEMI antenna includes the coil (H-field) antenna 105, the short loaded dipole (E-field) antenna 120, and feed points 135, 140.

The H-field antenna 105 includes the ferrite core 110, the wire coil 115, a first coupling point 406, and a second coupling point 408.

The E-field antenna 120 includes a conductive structure 402 (e.g. a conductive plate) having a first coupling point 410 and a second coupling point 412 separated by a first distance 413. The E-field antenna 120 also includes a conductive structure 404 having a first coupling point 414 and a second coupling point 416 separated by a second distance 417. In this example embodiment both conductive structures 402, 404 are driven by an RF current 418. The RF current 418 has AC and/or DC components, or both. This RF current 418 flowing through the conductive structures 402, 404 causes an E-field to be generated for communication.

In some example embodiments, the first and the second coupling points on one or both conductive structures 402, 404 are separated by a greatest attachable distance between any two locations on the conductive structure. Greatest attachable is herein defined to be a greatest distance permitted by whichever method of fabrication is used to make the NFEMI antenna 400. Thus some methods of fabrication may require that the coupling points be further from an edge of one or more portions of the conductive structures 402, 404 so that proper soldering can occur or so that stress fatigue does not break the antenna before its design lifetime. Such distances 413, 417 will then vary depending upon an application.

In other example embodiments the first and the second coupling points of the conductive structures 402, 404 are at located at less than the greatest attachable distance between any two locations on the conductive structure. Such a conductive structure then could generate the E-field by both the current 418 between, and a voltage at, the first and second coupling points of such conductive structure.

The first and second feed points 135, 140 carry a current 418 from transceiver circuitry (see FIG. 5) that may include a transmitter and/or to a receiver circuit along with other supporting circuitry. The current driven conductive structures 402, 404 generate an electric (E-field) near-field in response to the current 418 flowing over the first and second distances 413, 417. In some example embodiments the current 418 includes a DC current.

Thus the example 400 NFEMI antenna places the conductive structures 402, 404 of the E-field antenna 120 in series with the H-field antenna such that the RF current 418 generates an NFEMI E-field signal by flowing through the conductive structures 402, 404.

Figure 4B:
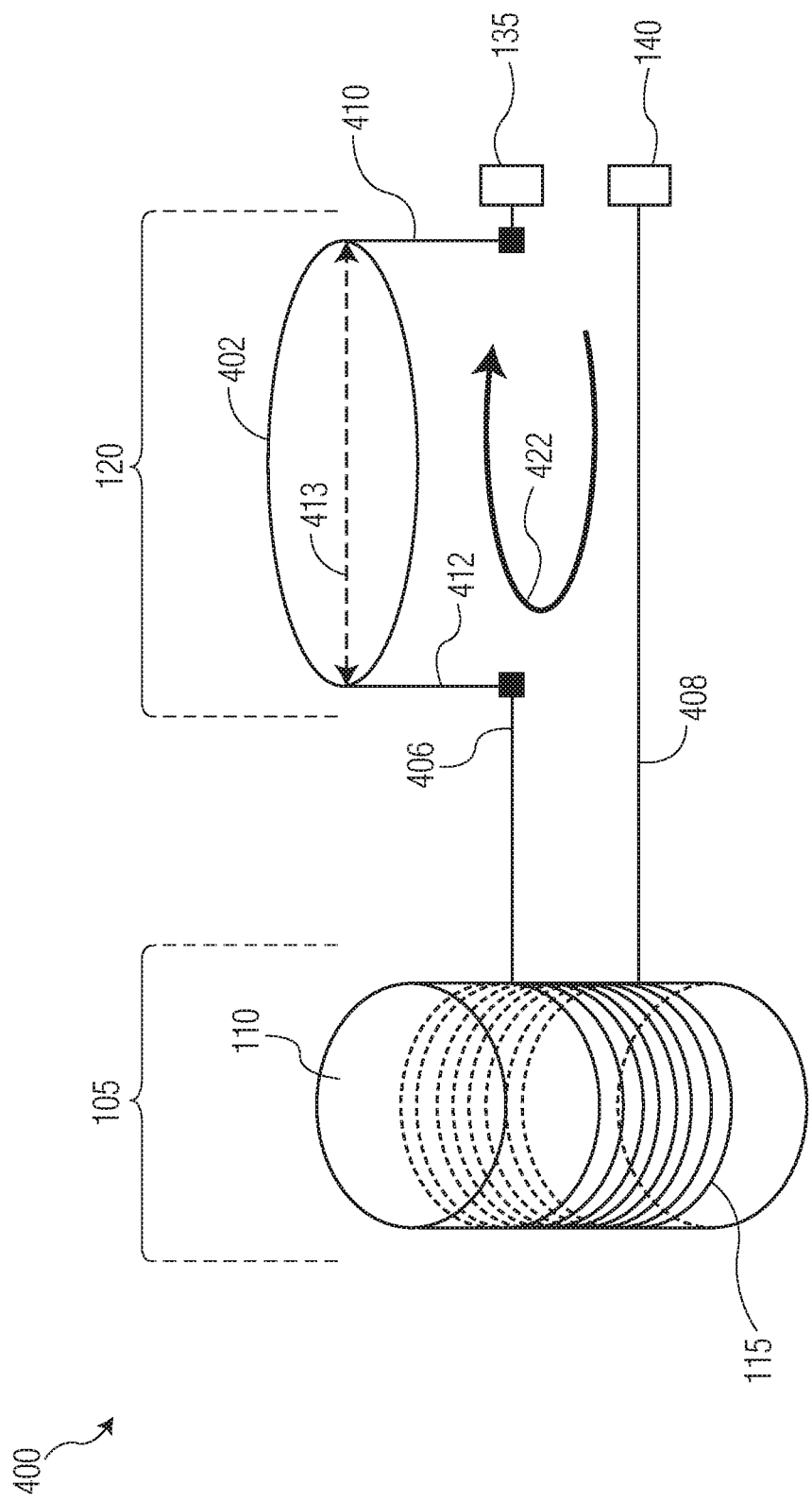
FIG. 4B is a second example NFEMI antenna having one current driven conductive structure.

FIG. 4B is a second example 420 NFEMI antenna having just one current driven conductive structure 402 and driven by current 422 to and/or from the feed points 135, 140.

Figure 5:
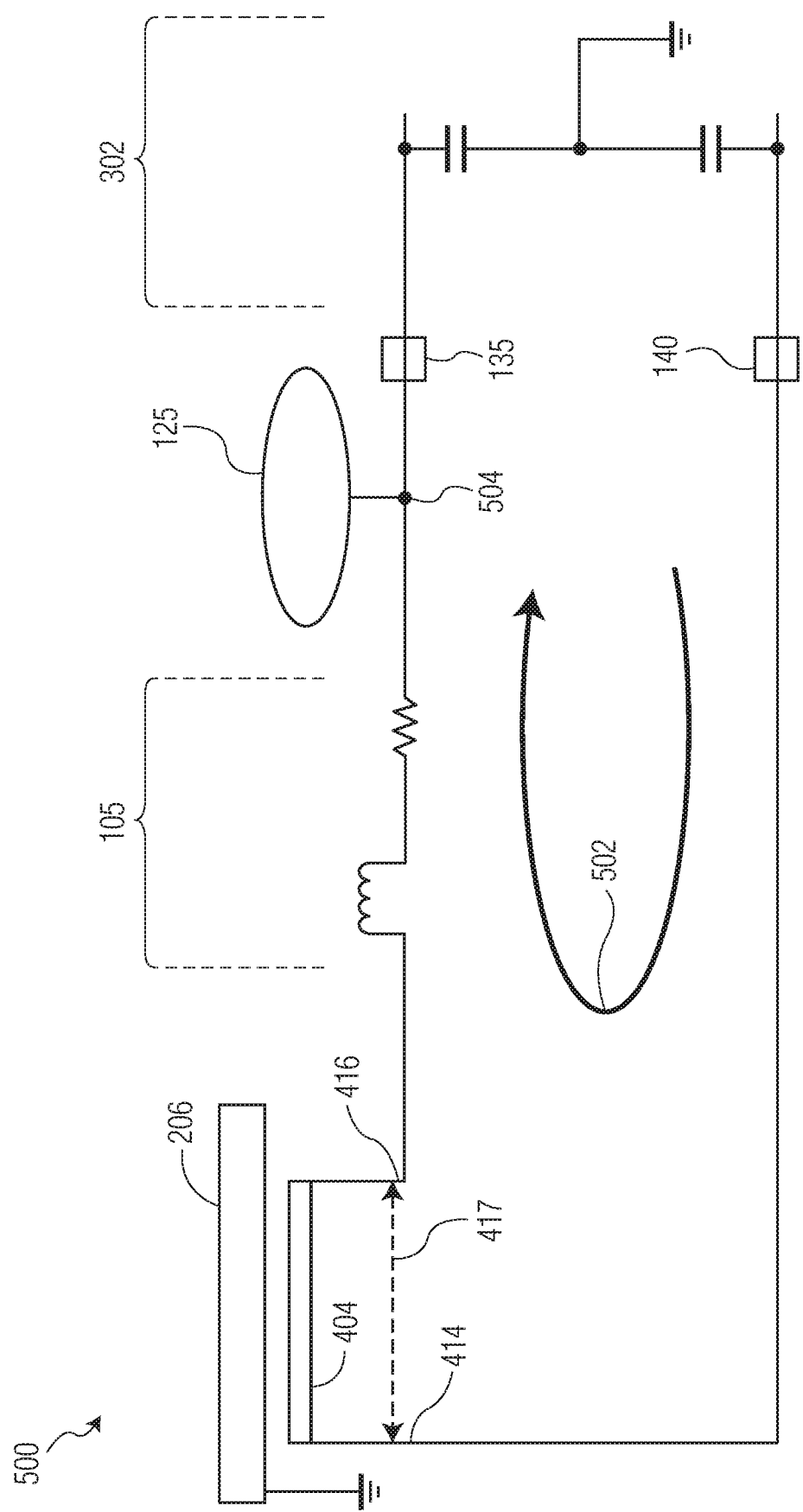
FIG. 5 is an example NFEMI antenna schematic having one current driven conductive structure, one voltage driven conductive structure and support circuitry proximate to a grounded electromagnetic interference (EMI) screen.

FIG. 5 is an example 500 NFEMI antenna schematic. The example 500 NFEMI antenna schematic includes the coil (H-field) antenna 105, a short loaded dipole (E-field) antenna having one voltage driven conductive structure 125 and one current driven conductive structure 404, feed points 135, 140, the conducting EMI screen 206, and the transceiver circuitry (RF-IC) 302. The transceiver circuitry (RF-IC) 302 could also be labeled as support circuitry and include addition circuits and/or a battery.

The one voltage driven conductive structure 125 has a single coupling point 504 and the one current driven conductive structure 404 has two coupling points 414, 416. Together the structures 125, 404 generate an E-field in response to a voltage at the single coupling point 504 and an RF current 502 passing between the two coupling points 414, 416.

The coil (H-field) antenna 105 includes a resistance that represents a loss in the wire and core of coil 115. The coil (H-field) antenna 105 is connected to the transceiver circuitry (RF-IC) 302. The transceiver circuitry (RF-IC) 302 has a balanced input configuration in this example but can also be designed to have an unbalanced input configuration.

The series combination of the coil (H-field) antenna 105, the conductive structure 404, and the voltage driven conductive structure 125 is tuned to resonance at the transmit and receive frequency by the transceiver circuitry (RF-IC) 302 having various capacitors as shown. The capacitors may include a capacitor bank. Additionally, a resistor bank can be included (not shown) for tuning a bandwidth of the NFEMI antenna 400.

When the antenna 400 is tuned, and in transmit mode, an RF resonance current 502 is flowing through the coil (H-field) antenna 105 and the conductive structure 404, but not through the voltage driven conductive structure 125.

Figure 6:
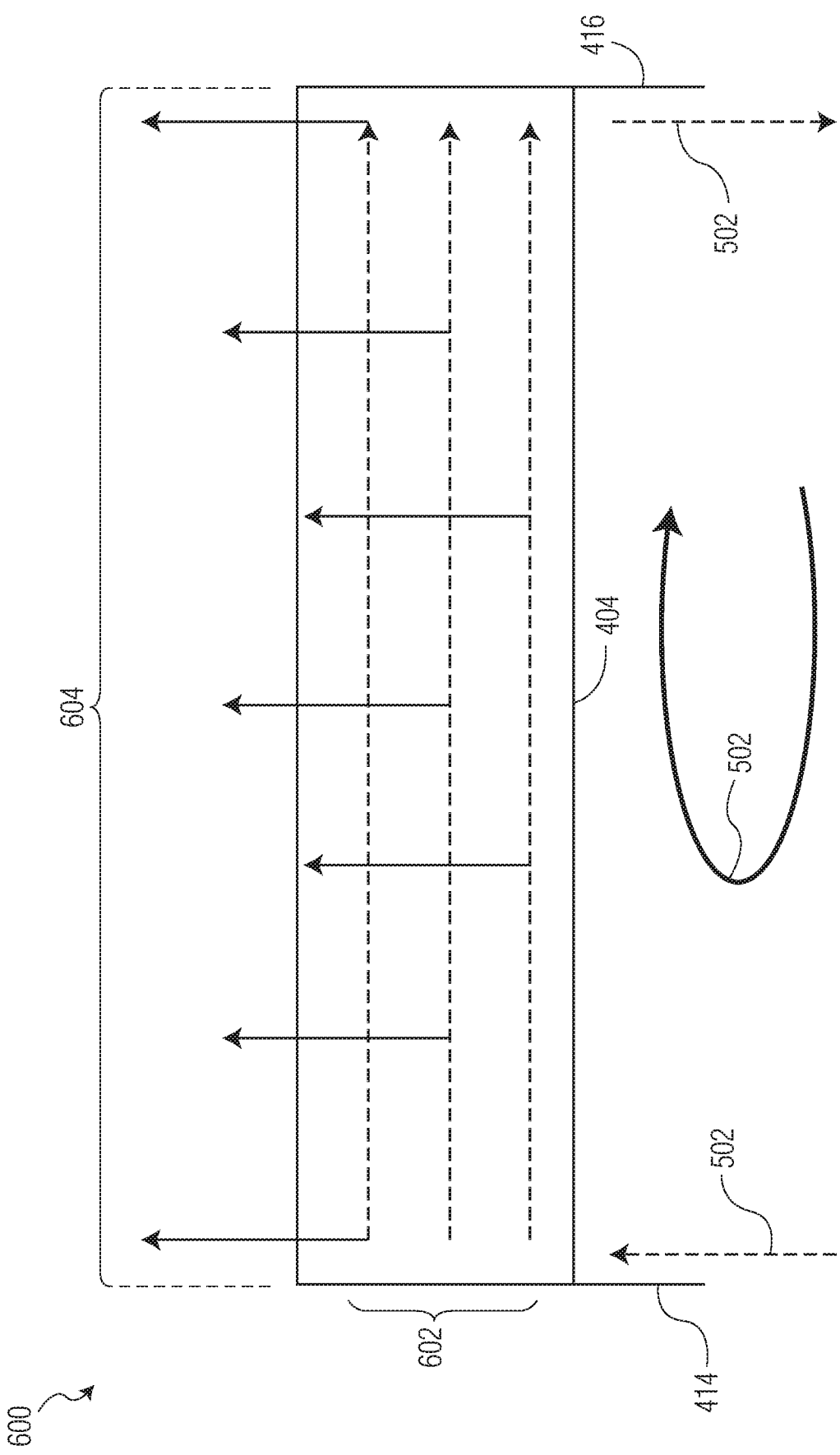
FIG. 6 is an example current distribution and electric field vector distribution based on the current flowing in the current driven conductive structure.

FIG. 6 is an example 600 current distribution 602 and electric field vector distribution 604. The example 600 includes the current driven conductive structure 404 having the first coupling point 414 and the second coupling point 416.

Since the conductive structure 404 has a certain surface area, the current 502 is spread out as the current distribution 602 across the conductive structure 404. The current distribution 602 in turn generates the electric field vector distribution 604 perpendicular to the surface area, according to the following equation: E=J/σ, wherein, E=electric field vector distribution 604 in V/meter; J=Current density in Ampere/meter$^2$ and σ=conductivity in Siemens/meter.

Since the current 502 is spread out over the conductive structure 404 there will be an electric field all over most if not all of the surface area of the conductive structure 404. Thus, the conductive structure 404 will function as an E-field antenna. Example measurements with a resonance current of 12 mA generate sufficient electric field signals to allow NFEMI communication over a human body.

Figure 7:
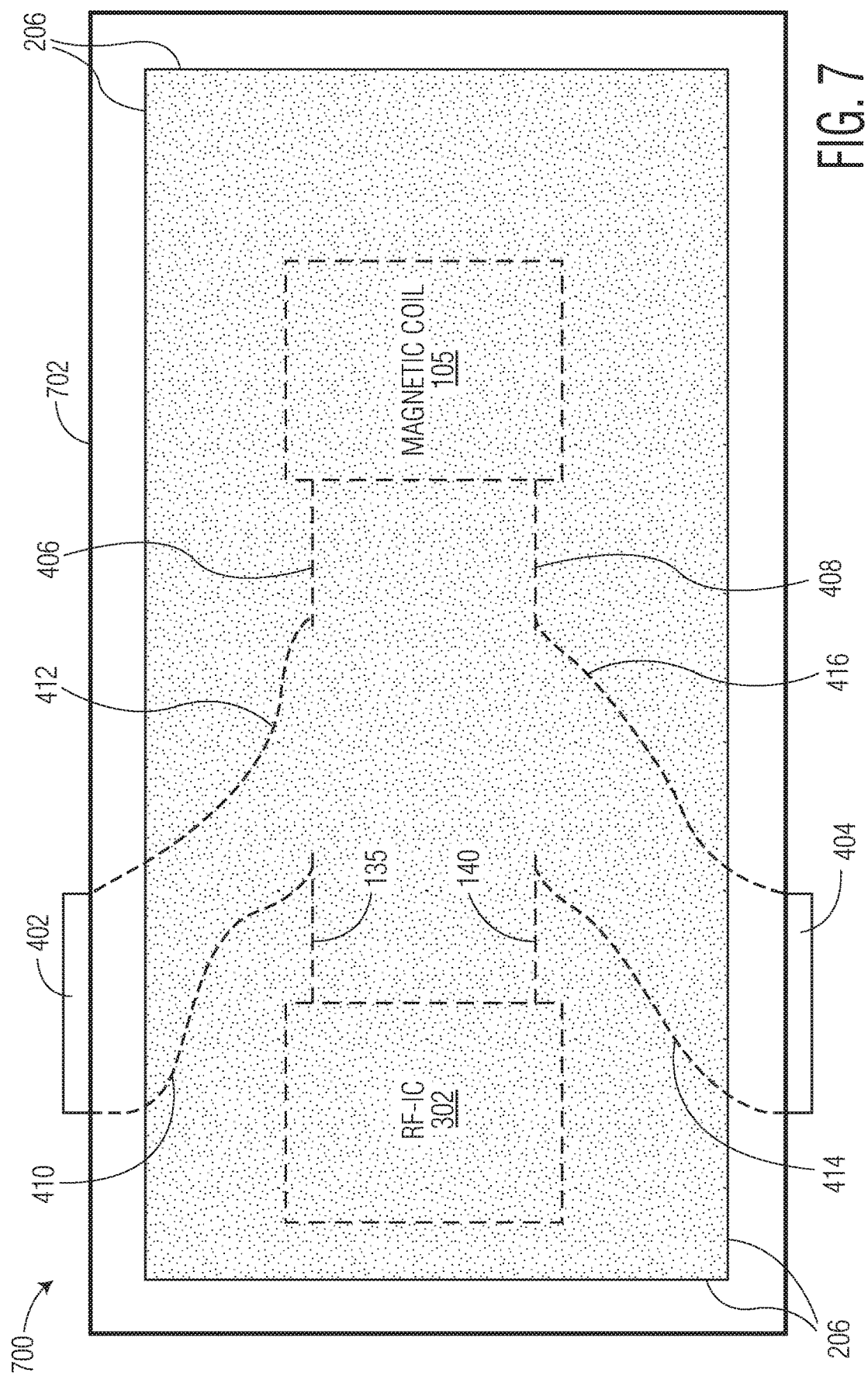
FIG. 7 is a first example of the NFEMI antenna having the two current driven conductive structures coupled to an electronic device (e.g. a smart phone).

FIG. 7 is a first example 700 of the NFEMI antenna 400 having the two conductive structures 402, 404 coupled to an electronic device 702. The conducting EMI screen 206 substantially covers various electronics inside the electronic device 702 to minimize external interference.

However, to maximize the NFEMI antenna's 400 E-field, the conductive structures 402, 404 are positioned outside of the EMI screen 206 and at locations (e.g. user touch points) where a user is likely to have close or direct contact with the conductive structures 402, 404 so as to further enhance the electric field vector distribution 604 and enable robust body network NFEMI communication.

These user touch points (i.e. the conductive structures 402, 404) can include: a power button, a volume control, or a device control button. In other example embodiments the user touch points could include an outer edge of the electronic device 702 configured to be in contact with a user. The user touch points may or may not, depending upon an application have galvanic contact with a user.

In various applications the electronic device 702 could be: a smartphone, a smartwatch, a wearable device, a hearing aid, an earbud, or a medical sensor.

The EMI screen 206 in some example embodiments can separate the conductive structures 402, 404 in the short loaded dipole (E-field) antenna 120 from the coil (H-field) antenna 105 and/or transceiver circuitry (RF-IC) 302. The EMI screen 206 can be a wire mesh or a thin flexible metal foil. In some example embodiments the EMI screen 206 is connected to a power supply.

Figure 8:
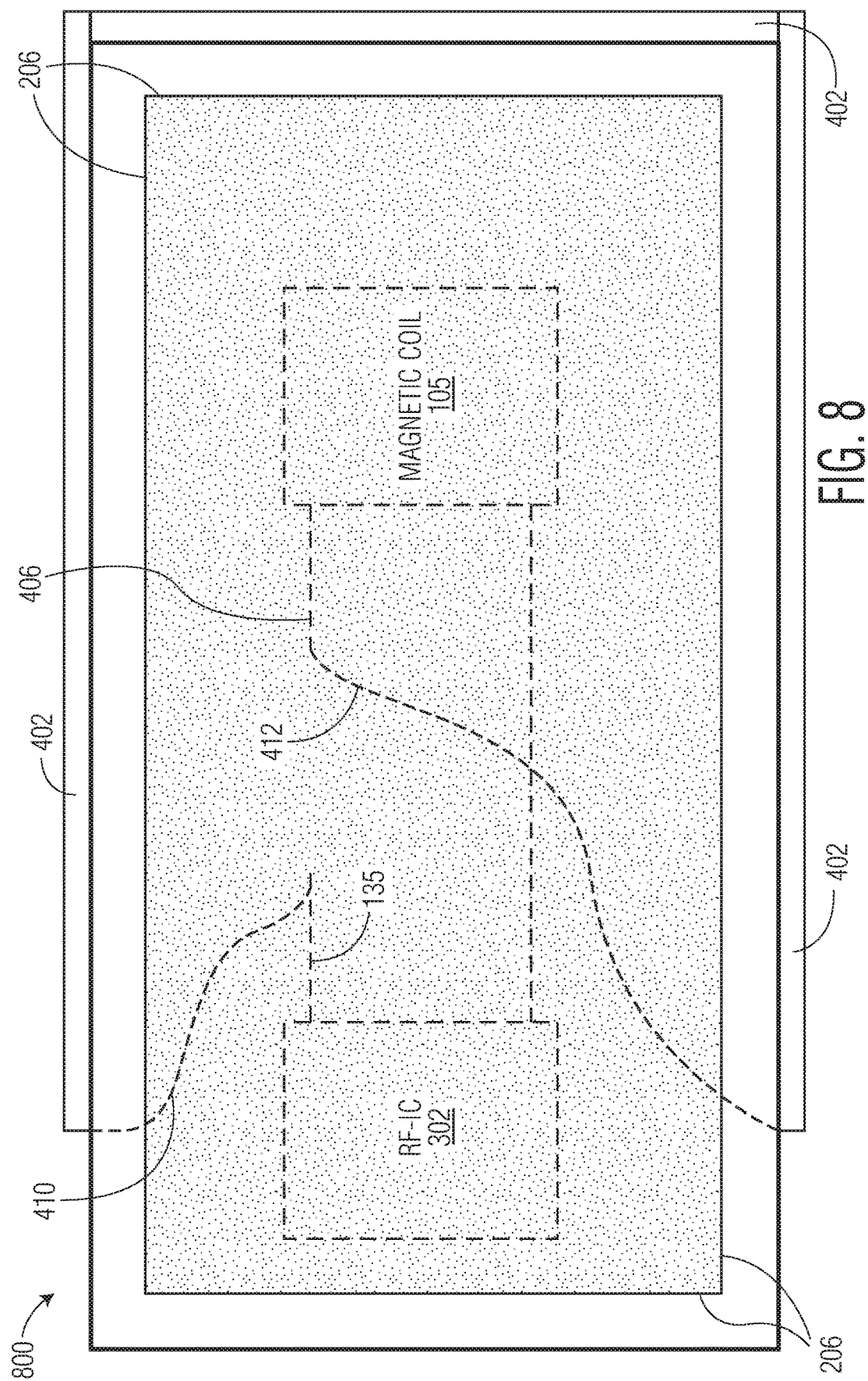
FIG. 8 is a second example of the NFEMI antenna having the current driven conductive structure coupled to an electronic device.

FIG. 8 is a second example 800 of the current driven NFEMI antenna 420 having the one current driven conductive structure 402 coupled to an electronic device 802. The conductive structure 402 (e.g. a conductive sheet) in this example embodiment surrounds a portion of the outside edge of the electronic device 802 (e.g. a smartphone).

As in FIG. 7, the conductive structure 402 is positioned outside of the EMI screen 206 and at locations where a user is likely to have close or direct contact with the conductive structure 402 (e.g. by holding the smartphone) so as to further enhance the electric field vector distribution 604 and enable robust body network NFEMI communication.

In both the FIG. 7 and FIG. 8 examples, direct "touch points" with a user's skin greatly enhance the E-field strength from the conductive structures 402, 404. The NFEMI antennas 400, 420 discussed above thus improve a reliability and robustness for wireless communication in applications near a human body in various consumer lifestyle and healthcare applications.

The NFEMI antennas 400, 420 however are not restricted for use near a human or animal body but can also be embedded in various wearable and/or handheld (e.g. smartphones) products, particularly those that include EMI shielding (i.e. the EMI screen 206) that would or might interfere with NFEMI signal reception.

The NFEMI EMI screen 206 in some example embodiments that permit the EMI screen 206 to float (i.e. no ground or power supply connections) may provide an alternate structure for generating E-fields that can enable other applications that may or may not use the EMI screen 206, or any metal structure in an electronic device, for shielding.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field electromagnetic induction (NFEMI) antenna device, comprising:
   a coil, having first and second coupling points, configured to generate and/or receive a magnetic (H-field) near-field signal;
   a conductive structure having first and second coupling points separated by a distance;
   first and second feed points configured to carry a current from a transmitter and/or to a receiver circuit;
   wherein the first coupling point of the conductive structure is coupled to the first feed point and wherein the second coupling point of the conductive structure is coupled to the first coupling point of the coil;
   wherein the second coupling point of the coil is coupled to the second feed point; and
   wherein the conductive structure is configured to generate an electric (E-field) near-field in response to the current flowing over the distance between the first and second coupling points of the conductive structure.

2. The device of claim 1:
   wherein the current is an RF current including either an AC current and/or DC current; and
   wherein the conductive structure is configured to generate the E-field in response to the RF current flowing over the distance between the first and second coupling points of the conductive structure.

3. The device of claim 1:
   wherein the current is spread out on the conductive structure such that E-field vectors cover a total surface of the conductive structure.

4. The device of claim 1:
   wherein the conductive structure is a short loaded dipole antenna.

5. The device of claim 1:
further comprising a second conductive structure having first and second coupling points separated by a second distance;
wherein the first coupling point of the second conductive structure is coupled to the second feed point and wherein the second coupling point of the second conductive structure is coupled to the second coupling point of the coil; and
wherein the second conductive structure is configured to generate a second E-field in response to the current flowing over the second distance between the first and second coupling points of the second conductive structure.

6. The device of claim 1:
further comprising a second conductive structure having a single coupling point;
wherein the single coupling point is coupled to either the first or second feed points; and
wherein the second conductive structure is configured to generate a second E-field in response to a voltage at the single coupling point.

7. The device of claim 1:
wherein the first and the second coupling points are separated by a greatest attachable (i.e. permitted by the method of fabrication used) distance between any two locations on the conductive structure.

8. The device of claim 1:
wherein the first and the second coupling points are at located at less than a greatest attachable distance between any two locations on the conductive structure; and
wherein the conductive structure is configured to generate the E-field by both the current between, and a voltage at, the first and second coupling points of the conductive structure.

9. The device of claim 1:
wherein the conductive structure is configured to prevent galvanic contact with a user.

10. The device of claim 1:
wherein the conductive structure is a substantially flat plate.

11. The device of claim 1:
further comprising an electronic device having a set of user touch points; and
wherein the conductive structure is coupled to at least one of the user touch points.

12. The device of claim 11:
wherein the user touch points include at least one of: a power button, a home button, a volume control, or a device control button.

13. The device of claim 11:
wherein the user touch points include an outer edge of the electronic device configured to be in contact with a user.

14. The device of claim 11:
wherein the user touch points are configured to be in direct contact with a user's skin.

15. The device of claim 11:
wherein the electronic device is at least one of: a smartphone, a smartwatch, a wearable device, a hearing aid, an earbud, or a medical sensor.

16. The device of claim 1:
further comprising an electromagnetic interference (EMI) screen;
wherein the conductive structure is on one side of the EMI screen; and
wherein the coil is on an opposite side of the EMI screen.

17. The device of claim 16:
wherein the EMI screen is a wire mesh.

18. The device of claim 16:
wherein the EMI screen is connected to a power supply.

19. The device of claim 1:
further comprising an electronic device having a set of circuits, and an electromagnetic interference (EMI) screen; and
wherein the set of circuits are on one side of the EMI screen and the conductive structure is on an opposite side of the EMI screen.

20. The device of claim 1:
wherein the NFEMI antenna is coupled to a set of supporting circuitry including at least one of: a balanced or unbalanced transceiver, a capacitor bank for tuning the antenna for a particular resonance frequency; or a resistor bank for adjusting a bandwidth of the antenna.

* * * * *